United States Patent [19]
Cobble

[11] Patent Number: 5,269,092
[45] Date of Patent: Dec. 14, 1993

[54] FLY TRAP APPARATUS

[76] Inventor: C. M. Cobble, Box 333, Rte. 3, Afton, Tenn. 37616

[21] Appl. No.: 970,380

[22] Filed: Nov. 2, 1992

[51] Int. Cl.⁵ .............................................. A01M 3/02
[52] U.S. Cl. ...................................................... 43/137
[58] Field of Search .................. 43/134, 135, 136, 137

[56] References Cited

U.S. PATENT DOCUMENTS

| | | | |
|---|---|---|---|
| 1,656,969 | 1/1928 | Babl | 43/137 |
| 4,787,171 | 11/1988 | Dagenais | 43/137 |
| 4,905,408 | 3/1990 | Wu | 43/137 |

FOREIGN PATENT DOCUMENTS 16917 of 1915 United Kingdom .................. 43/136

Primary Examiner—Kurt C. Rowan
Attorney, Agent, or Firm—Leon Gilden

[57] ABSTRACT

A trap structure configured as a fly swatter for selective use as a fly swatter is directed to an adhesive coated web mounted about a flexible shape retentive framework arranged to attract a fly adhesively permitting its subsequent removal exteriorly of an associated dwelling to avoid impacting the fly.

2 Claims, 4 Drawing Sheets

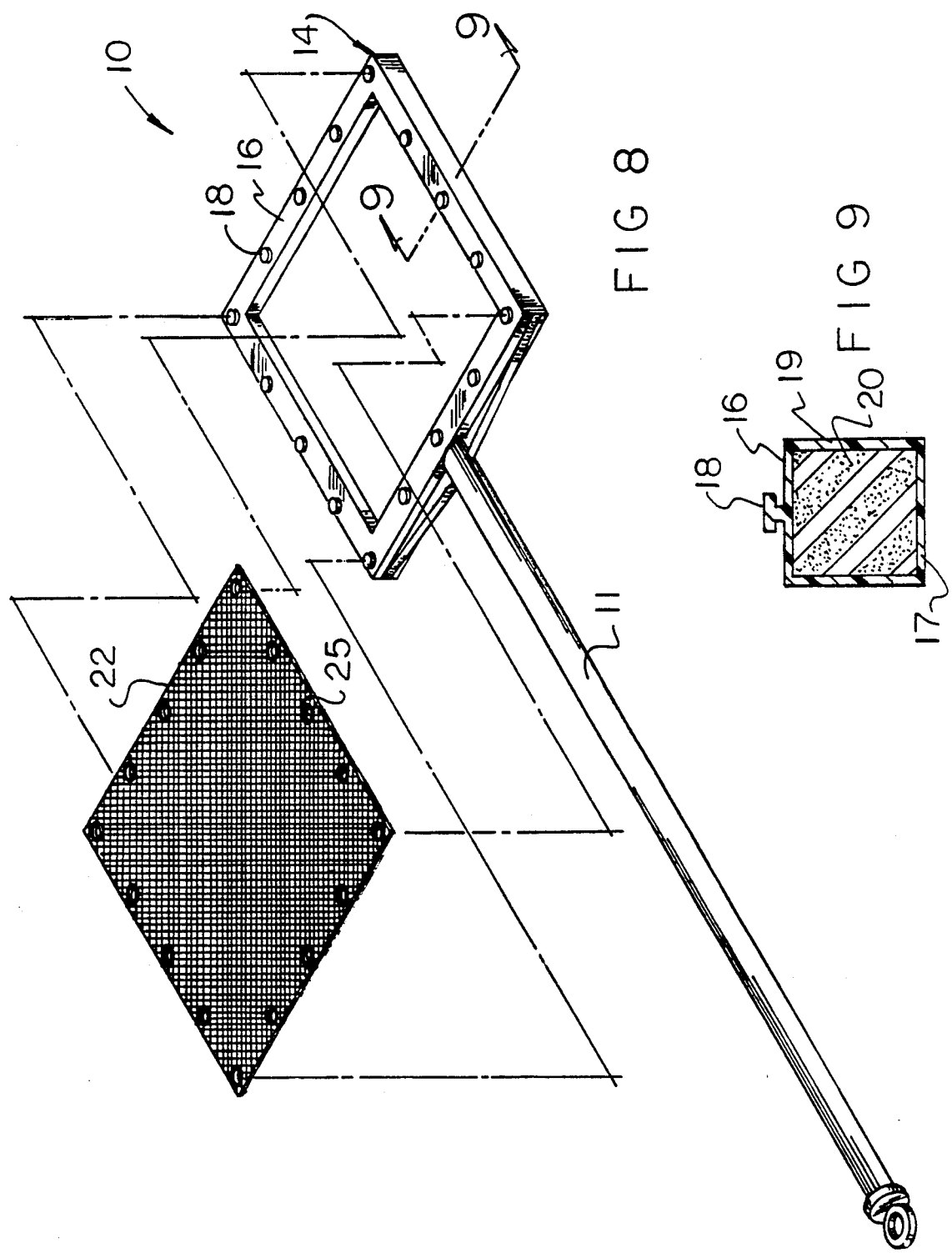

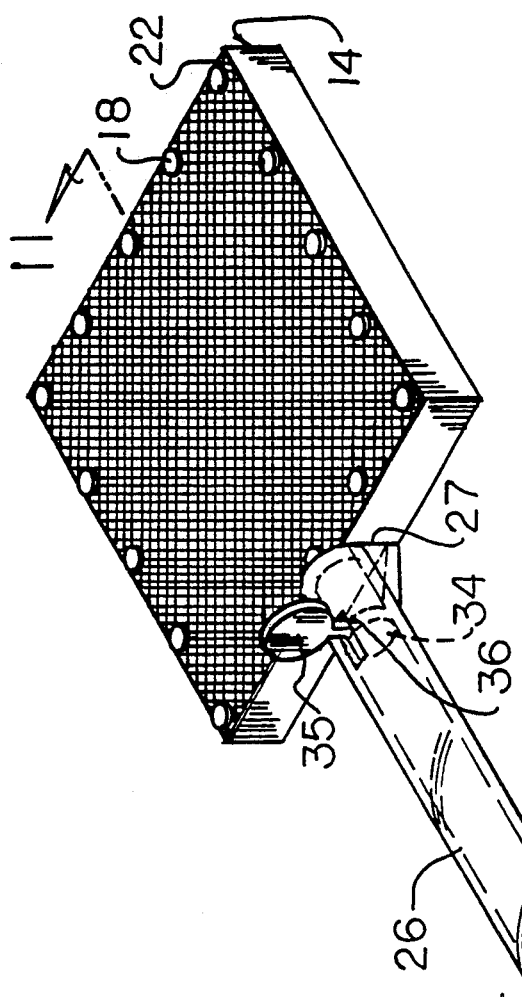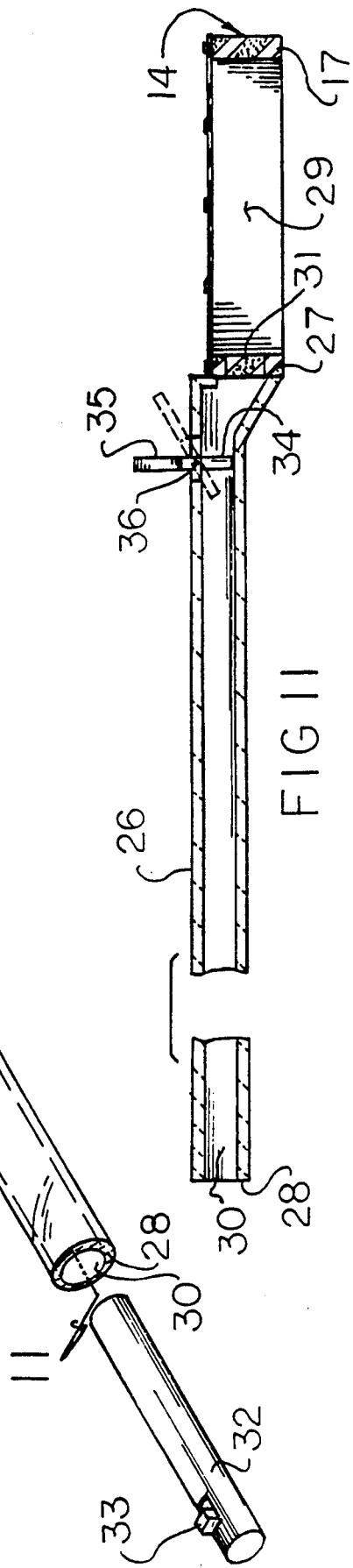

FLY TRAP APPARATUS

BACKGROUND OF THE INVENTION

1. Field of the Invention

The field of invention relates to fly trap apparatus, and more particularly pertains to a new and improved fly trap apparatus wherein the same is arranged to minimize impact and associated cleanup relative to a conventional use of a fly swatter relative to a crushed fly.

2. Description of the Prior Art

Conventional use of fly swatter structure requires the crushing of the fly to effect its demise and attendant cleanup therewith. The instant invention sets forth a fly swatter type structure that may be directed at a fly to secure the fly permitting its subsequent removal exteriorly of a dwelling. Prior art fly attractant type structure is exemplified in the U.S. Pat. Nos. 4,244,135; 4,738,049; 3,855,727; and 4,793,092.

The instant invention attempts to overcome deficiencies of the prior art by providing for the structure arranged for use as a fly swatter and alternatively as a fly adhering and attracting structure.

SUMMARY OF THE INVENTION

In view of the foregoing disadvantages inherent in the known types of fly trap apparatus now present in the prior art, the present invention provides a fly trap apparatus wherein the same utilizes an adhesive coated web mounted to a deformable framework arranged for securing a fly thereon for subsequent release. As such, the general purpose of the present invention, which will be described subsequently in greater detail, is to provide a new and improved fly trap apparatus which has all the advantages of the prior art fly trap apparatus and none of the disadvantages.

To attain this, the present invention provides a trap structure configured as a fly swatter for selective use as a fly swatter and directed to an adhesive coated web mounted about a flexible shape retentive framework arranged to attract a fly adhesively permitting its subsequent removal exteriorly of an associated dwelling to avoid impacting the fly.

My invention resides not in any one of these features per se, but rather in the particular combination of all of them herein disclosed and claimed and it is distinguished from the prior art in this particular combination of all of its structures for the functions specified.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. Those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved flay trap apparatus which has all the advantages of the prior art fly trap apparatus and none of the disadvantages.

It is another object of the present invention to provide a new and improved fly trap apparatus which may be easily and efficiently manufactured and marketed.

It is a further object of the present invention to provide a new and improved fly trap apparatus which is of a durable and reliable construction.

An even further object of the present invention is to provide a new and improved fly trap apparatus which is susceptible of low cost of manufacture with regard to both materials and labor, and which accordingly is then susceptible of low prices of sale to the consuming public, thereby making such fly trap apparatus economically available to the buying public.

Still yet another object of the present invention is to provide a new and improved fly trap apparatus which provides in the apparatuses and methods of the prior art some of the advantages thereof, while simultaneously overcoming some of the disadvantages normally associated therewith.

These together with other objects of the invention, along with the various features of novelty with characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 8 is an isometric illustration in a disassembled configuration of the invention.

FIG. 9 is an orthographic view, taken along the lines 9—9 of FIG. 8 in the direction indicated by the arrows.

FIG. 10 is an isometric illustration of a modified handle structure employed by the invention.

FIG. 11 is an orthographic view, taken along the lines 11—11 of FIG. 10 in the direction indicated by the arrows.

DESCRIPTION OF THE PREFERRED EMBODIMENT

Figure 1:
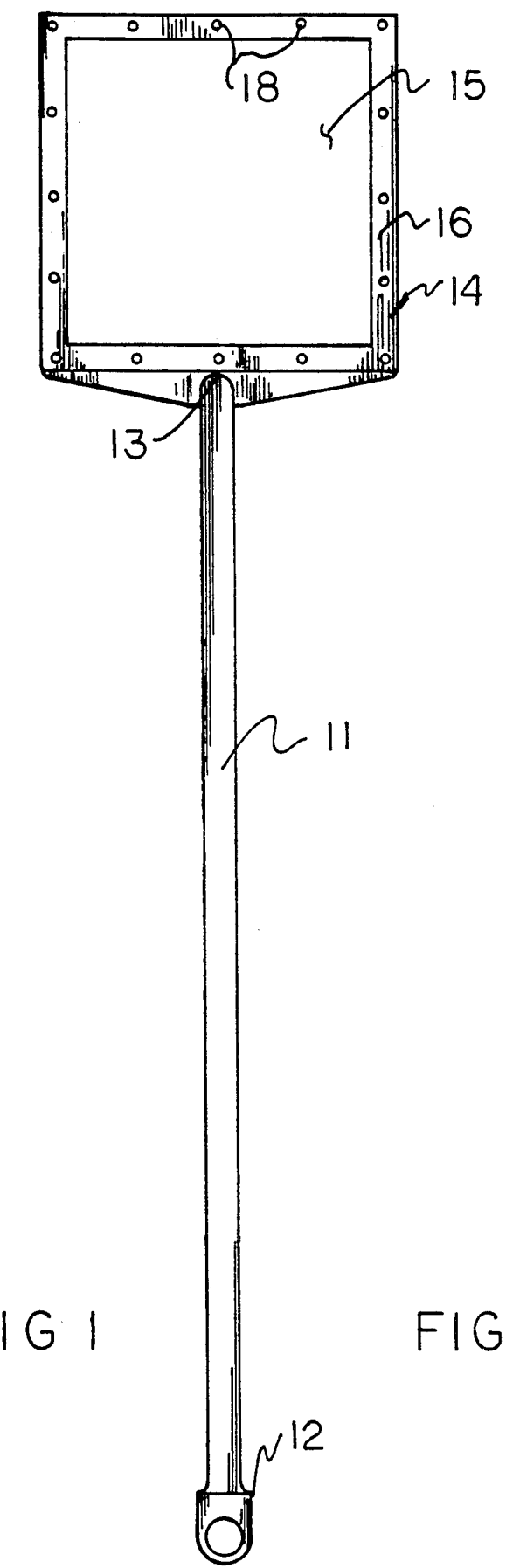
FIG. 1 is an orthographic view of the framework structure of the invention.
Figure 2:
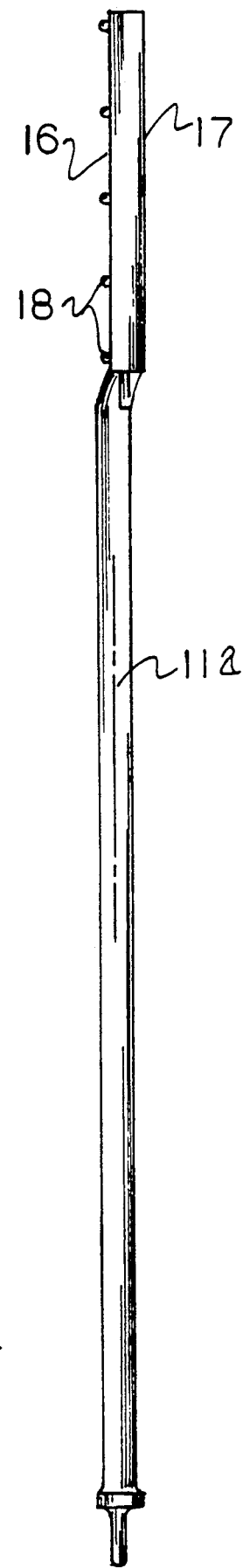
FIG. 2 is an orthographic side view of the invention, as indicated in FIG. 1.
Figure 3:
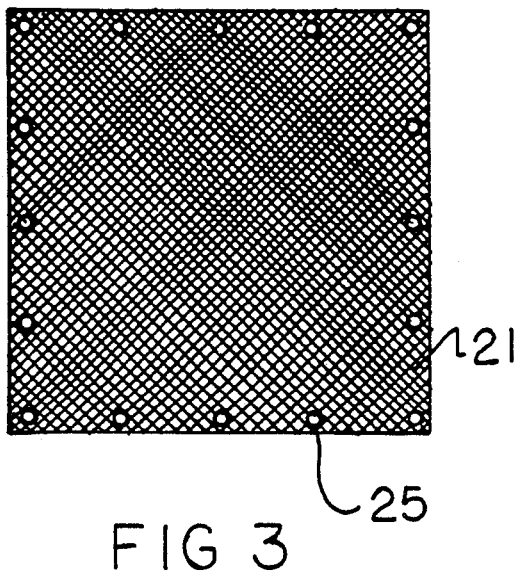
FIG. 3 is an orthographic top view of a mesh screen web utilized by the invention.
Figure 5:
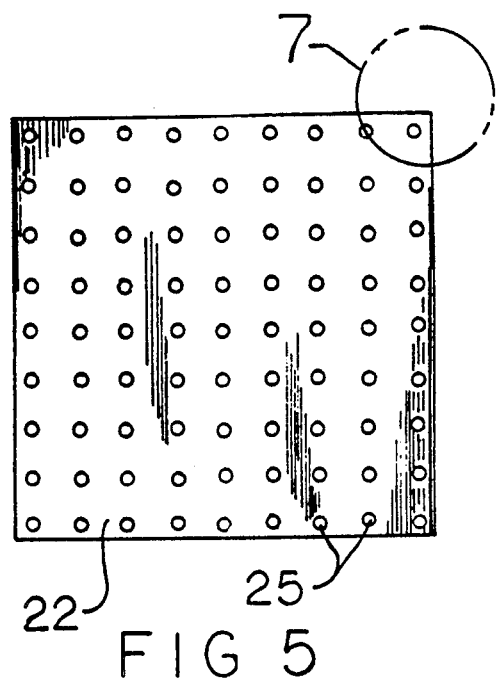
FIG. 5 is an orthographic view of a flexible adhesively coated apertured web.
Figure 4:
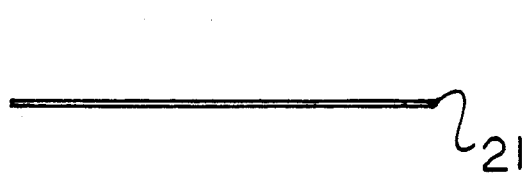
FIG. 4 is an end view of the web, as indicated in FIG. 3.
Figure 6:
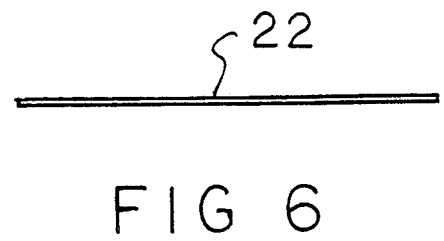
FIG. 6 is an orthographic end view of the web, as indicated in FIG. 5.
Figure 7:
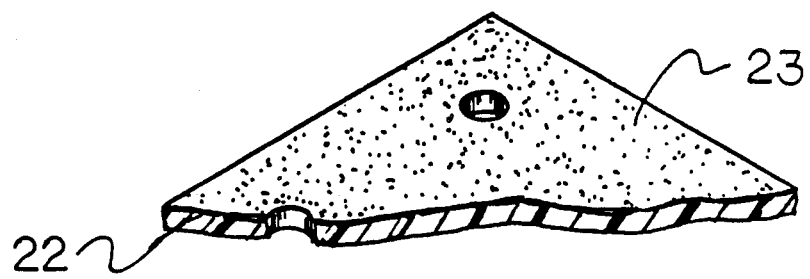
FIG. 7 is an enlarged isometric illustration of section 7 as set forth in FIG. 5.

With reference now to the drawings, and in particular to FIGS. 1 to 11 thereof, a new and improved fly trap apparatus embodying the principles and concepts of the present invention and generally designated by the reference numeral 10 will be described.

More specifically, the fly trap apparatus 10 of the instant invention essentially comprises an elongate handle 11, having a first end 12 spaced from a second end 13. A continuous frame 14 is fixedly mounted to the elongate handle 11. The handle is symmetrically oriented about a handle axis 11a, with a frame 14 having a frame top wall 16 spaced from and parallel a frame bottom wall 17, with the frame top wall and bottom wall parallel to the axis 11a. A frame central opening 15 is directed through the frame, with the top wall 16 having a plurality of top wall lugs 18 fixedly mounted thereon spaced apart a predetermined spacing. The frame 14 is formed of a frame outer polymeric shell 19 (see FIG. 9) having a polymeric foam core 20 therewithin. The framework 14 in this manner is arranged for deflection and subsequent spring-back into its original configuration to define the shape retentive characteristic of the frame structure. A mesh screen web 21 or alternatively an apertured flexible polymeric web 22 is provided, each having a web perimeter, with each web perimeter including a plurality of web apertures 25 spaced apart the predetermined spacing of the lugs 18 to permit securement of selectively the screen web 21 or the polymeric web 22, or into the frame's top wall 16. The mesh screen web 21, as well as the polymeric web 22, includes an adhesive layer 23 imposed thereon projecting beyond the frame, whereupon a fly may be secured onto the web rather than crushed in a typical manner creating the associated and attendant mess requiring cleanup. In this manner, a fly may be taken exteriorly of a dwelling for its removal and disposal.

The FIG. 10 indicates the structure as described above, but to have the handle 11 formed as a modified tubular handle 26, including a handle bore 30 directed coextensively therethrough. The modified tubular handle 26 includes a first end 27 spaced from a second end 28. The first end 27 includes a frame bore 31 directed through the frame 14 into communication with the handle bore 30. The tubular handle second end 28 receives a flashlight tube cylinder 32 therewithin, having a flashlight switch 33 to direct illumination within the handle bore 30 and into the frame cavity 29 oriented below the mesh screen web 21 and above the frame bottom wall 17. The illumination is arranged to attract insects that are captured by the structure being directed downwardly along the insect and positioning the insect within the cavity 29 secured to a table surface. A door plate 34 is provided for pivotal mounting within the bore 31 pivotally mounted about a door plate axle 36, with a door plate projection 35 projecting above the handle 26 for manual displacement of the door plate 34 permitting access of a fly captured within the cavity 29 into the bore 30 for its securement within the handle for subsequent release. Such release is effected by removal of the flashlight cylinder 32.

As to the manner of usage and operation of the instant invention, the same should be apparent from the above disclosure, and accordingly no further discussion relative to the manner of usage and operation of the instant invention shall be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A fly trap apparatus, comprising, an elongate handle, the elongate handle having a first and spaced from a second end, and a continuous frame, the continuous frame fixedly mounted to the first end, with the handle symmetrically oriented about a handle axis, and the continuous frame having a frame top wall spaced from a frame bottom wall in a parallel relationship, and the frame top wall and the frame bottom wall arranged parallel relative to the axis, the frame top wall having a plurality of top wall lugs fixedly mounted to the top wall spaced apart a predetermined spacing, and a screen web member, the screen web member having a plurality of screen web apertures directed through the web member in adjacency to a perimeter of the web member, with the screen apertures spaced apart the predetermined spacing for securement to the top wall lugs, and the screen web member includes an adhesive layer coextensive with the screen web member, with the continuous frame having a frame cavity below the screen web member and above the frame bottom wall, and the adhesive layer projecting beyond and exteriorly of the cavity, and the frame is formed of a deformable shape retentive material having a flexible outer sheath and a foam core coextensive within the sheath, and the handle includes a handle bore coextensive with the handle, and a frame bore directed through the frame in communication with the handle bore at the handle first end, and the handle second end having a flashlight cylinder removably mounted therefrom for attracting a flying insect within the cavity into the handle bore upon illumination of the flashlight cylinder.

2. An apparatus as set forth in claim 1 including a door plate pivotally mounted within the handle bore in adjacency to the handle first end, with the door plate having a door plate projection positioned exteriorly of the door handle and integral with the door plate, and a plate axle mounted within the handle at an intersection of the door plate and the door plate projection permitting pivoting of the door plate relative to the handle bore, and the door plate axle mounted within a slot of the handle.

* * * * *